United States Patent
Hu et al.

(10) Patent No.: US 9,888,487 B2
(45) Date of Patent: Feb. 6, 2018

(54) HIGH INTERFERENCE INDICATOR FOR TIME DIVISION DUPLEX WIRELESS COMMUNICATION SYSTEMS

(75) Inventors: Teck Hu, Melbourne, FL (US); Jiyong Pang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 170 days.

(21) Appl. No.: 14/375,246

(22) PCT Filed: Jan. 29, 2012

(86) PCT No.: PCT/CN2012/070739
§ 371 (c)(1),
(2), (4) Date: Nov. 21, 2014

(87) PCT Pub. No.: WO2013/110218
PCT Pub. Date: Aug. 1, 2013

(65) Prior Publication Data
US 2015/0078220 A1    Mar. 19, 2015

(51) Int. Cl.
*H04W 72/12* (2009.01)
*H04J 3/00* (2006.01)
(Continued)

(52) U.S. Cl.
CPC ............ *H04W 72/1231* (2013.01); *H04J 3/00* (2013.01); *H04W 24/08* (2013.01); *H04W 72/0426* (2013.01)

(58) Field of Classification Search
CPC ....................................................... H04J 3/00
(Continued)

(56) References Cited

U.S. PATENT DOCUMENTS

| | | | | |
|---|---|---|---|---|
| 5,959,980 A | * | 9/1999 | Scott | H04B 7/2656 370/280 |
| 5,983,099 A | * | 11/1999 | Yao | H04W 84/08 455/426.1 |

(Continued)

FOREIGN PATENT DOCUMENTS

| | | |
|---|---|---|
| CN | 102065490 A | 5/2011 |
| CN | 102149099 A | 8/2011 |

(Continued)

OTHER PUBLICATIONS

International Search Report for PCT/CN2012/070739 dated Nov. 15, 2012.
(Continued)

*Primary Examiner* — Andrew Lai
*Assistant Examiner* — Andrew C Lee
(74) *Attorney, Agent, or Firm* — Fay Sharpe, LLP

(57) ABSTRACT

Embodiments of the claimed subject matter provide embodiments of methods for supporting dynamic sub frame reconfiguration in a time division duplex wireless communication system. One embodiment includes transmitting, from a first base station to a second base station, a message indicating that the first base station is configured for scheduling uplink transmissions from first user equipment in one or more subframes of a time division duplex frame. The message is transmitted when the second base station is configured for downlink transmission to second user equipment in the subframe(s).

18 Claims, 5 Drawing Sheets

(51) Int. Cl.
*H04W 24/08* (2009.01)
*H04W 72/04* (2009.01)

(58) Field of Classification Search
USPC ........ 370/280, 329, 315, 310, 331, 252, 340
See application file for complete search history.

(56) References Cited

U.S. PATENT DOCUMENTS

| | | | | |
|---|---|---|---|---|
| 6,334,057 B1* | 12/2001 | Malmgren | .......... | H04W 72/082 370/329 |
| 6,408,179 B1* | 6/2002 | Stosz | ................ | H04B 7/18539 370/328 |
| 6,434,367 B1* | 8/2002 | Kumar | ................ | H04W 52/143 370/331 |
| 7,356,001 B1* | 4/2008 | Jones | ................ | H04W 84/02 370/331 |
| 7,436,801 B1* | 10/2008 | Kanterakis | .......... | H04W 74/008 370/329 |
| 7,752,441 B2* | 7/2010 | Mizikovsky | .............. | H04L 9/12 370/349 |
| 7,936,831 B2* | 5/2011 | Laroia | .................. | H04L 1/0004 375/259 |
| 8,145,224 B2* | 3/2012 | Cho | .................... | H04W 72/042 370/328 |
| 8,155,701 B2* | 4/2012 | Balachandran | ..... | H04L 27/0008 370/344 |
| 8,626,151 B2* | 1/2014 | Beppler | ................ | H04W 48/18 370/252 |
| 8,737,334 B2* | 5/2014 | Ahn | ...................... | H04L 5/0048 370/312 |
| 8,744,362 B2* | 6/2014 | Kawahatsu | ........... | H04L 1/0003 455/443 |
| 8,780,784 B2* | 7/2014 | Chung | ................ | H04L 27/2613 370/315 |
| 8,792,425 B2* | 7/2014 | Power | ................... | H04L 1/0028 370/329 |
| 8,811,351 B2* | 8/2014 | Jung | ......................... | H04L 1/20 370/332 |
| 8,886,113 B2* | 11/2014 | Palanki | .................. | H04B 7/155 455/11.1 |
| 8,891,485 B2* | 11/2014 | Ohta | ....................... | H04L 47/10 370/331 |
| 8,923,267 B2* | 12/2014 | Soliman | .............. | H04W 76/023 370/343 |
| 8,923,367 B2* | 12/2014 | Okuda | ......................... | 370/469 |
| 9,001,793 B2* | 4/2015 | Takano | .............. | H04B 7/15507 370/329 |
| 9,002,387 B2* | 4/2015 | Astely | ................. | H04W 72/082 370/252 |
| 9,026,037 B2* | 5/2015 | Sawai | ................... | H04B 7/2606 455/7 |
| 9,030,979 B2* | 5/2015 | Cheng | ............... | H04W 52/0229 370/311 |
| 9,210,586 B2* | 12/2015 | Catovic | .................. | H04W 24/02 |
| 9,219,530 B2* | 12/2015 | Koo | ................. | H04B 7/024 |
| 2002/0080719 A1* | 6/2002 | Parkvall | ................ | H04L 1/0001 370/235 |
| 2002/0111163 A1* | 8/2002 | Hamabe | .............. | H04W 72/082 455/425 |
| 2002/0141357 A1* | 10/2002 | Park | .................... | H04W 76/005 370/328 |
| 2005/0025093 A1* | 2/2005 | Yun | .................... | H04W 76/02 370/328 |
| 2005/0117521 A1* | 6/2005 | Abrol | .................. | H04L 1/1809 370/252 |
| 2006/0182030 A1* | 8/2006 | Harris | .................. | H04L 1/1809 370/230 |
| 2007/0173239 A1* | 7/2007 | Scott | ................. | H04L 29/06027 455/417 |
| 2008/0013480 A1* | 1/2008 | Kapoor | ..................... | H04L 5/14 370/328 |
| 2008/0285500 A1* | 11/2008 | Zhang | ................ | H04B 7/15507 370/315 |
| 2009/0017843 A1* | 1/2009 | Laroia | ................. | H04W 76/023 455/458 |
| 2009/0082064 A1* | 3/2009 | Li | ......................... | H04W 72/12 455/562.1 |
| 2009/0207761 A1* | 8/2009 | Tangemann | ........... | H04B 7/155 370/281 |
| 2010/0020974 A1* | 1/2010 | Tsai | ....................... | H04L 63/068 380/270 |
| 2010/0080164 A1* | 4/2010 | Power | ................... | H04W 74/02 370/315 |
| 2010/0087221 A1* | 4/2010 | Srinivasan | ............ | H04W 16/08 455/522 |
| 2010/0091728 A1* | 4/2010 | Kim | ...................... | H04L 5/0044 370/329 |
| 2010/0142466 A1* | 6/2010 | Palanki | ................ | H04J 11/0053 370/329 |
| 2010/0157845 A1* | 6/2010 | Womack | ............... | H04B 7/2606 370/254 |
| 2010/0189075 A1* | 7/2010 | Iwamura | ............ | H04W 36/0055 370/331 |
| 2010/0202543 A1* | 8/2010 | Raif | ........................ | H04W 64/00 375/260 |
| 2010/0296461 A1* | 11/2010 | Yoshii | .................... | H04J 11/005 370/329 |
| 2010/0322067 A1* | 12/2010 | Tenny | .................. | H04W 76/028 370/216 |
| 2011/0013592 A1* | 1/2011 | Uemura | ................ | H04W 24/10 370/331 |
| 2011/0051643 A1* | 3/2011 | Hans | .................. | H04W 72/1263 370/311 |
| 2011/0128893 A1* | 6/2011 | Park | ....................... | H04B 7/155 370/279 |
| 2011/0149813 A1 | 6/2011 | Parkvall et al. | | |
| 2011/0222522 A1* | 9/2011 | Akil | ........................ | H04B 1/74 370/338 |
| 2011/0255514 A1* | 10/2011 | Olofsson | ........... | H04W 72/0426 370/331 |
| 2011/0286370 A1* | 11/2011 | Tang | .................. | H04W 72/0446 370/280 |
| 2011/0294534 A1* | 12/2011 | Gunder | ................. | H04W 60/00 455/524 |
| 2011/0319066 A1* | 12/2011 | Chou | ................ | H04W 36/0077 455/422.1 |
| 2012/0009959 A1* | 1/2012 | Yamada | ................ | H04B 7/0413 455/507 |
| 2012/0044893 A1* | 2/2012 | Suzuki | ............. | H04W 72/0413 370/329 |
| 2012/0069795 A1* | 3/2012 | Chung | ................ | H04B 7/15542 370/315 |
| 2012/0108255 A1* | 5/2012 | Jo | ....................... | H04W 72/1263 455/450 |
| 2012/0113961 A1* | 5/2012 | Krishnamurthy | ..... | H04L 1/0026 370/332 |
| 2012/0178482 A1* | 7/2012 | Seo | ........................ | H04W 56/00 455/501 |
| 2012/0182968 A1* | 7/2012 | Chin | ..................... | H04W 52/40 370/331 |
| 2012/0184206 A1* | 7/2012 | Kim | ...................... | H04L 5/0091 455/9 |
| 2012/0213189 A1* | 8/2012 | Choi | .......... | H04W 72/1231 370/329 |
| 2012/0250592 A1* | 10/2012 | Chun | ..................... | H04L 1/1887 370/280 |
| 2012/0257519 A1* | 10/2012 | Frank | .................. | H04L 5/0035 370/252 |
| 2013/0034030 A1* | 2/2013 | Chun | .................... | H04B 7/15542 370/281 |
| 2013/0235839 A1* | 9/2013 | Kim | ...................... | H04L 5/0092 370/329 |

(56) References Cited

U.S. PATENT DOCUMENTS

2013/0329711 A1* 12/2013 Seo .................... H04J 11/0069
370/336
2014/0126501 A1 5/2014 Pan et al.

FOREIGN PATENT DOCUMENTS

| CN | 102158910 A | 8/2011 |
|---|---|---|
| CN | 102271414 A | 12/2011 |
| EP | 1 841 266 A2 | 10/2007 |
| EP | 2 696 645 A1 | 2/2014 |
| JP | 2011-504062 A | 1/2011 |
| JP | 2001-358651 A | 12/2011 |
| JP | 2013-516100 A | 5/2013 |
| WO | 2011/052643 A1 | 5/2011 |
| WO | WO 2011/077288 A2 | 6/2011 |

OTHER PUBLICATIONS

Alcatel-Lucent, Alcatel-Lucent Shanghai Bell, "TDD DL-UL Reconfiguration Study Item," 3GPP TSG-RAN-WG4 Meeting #60, Athens, Greece, Aug. 22-26, 2011, Agenda Item: 10.4, Document for: Discussion, R4-114063, 4 pages.

"3rd Generation Partnership Project; Technical Specification Group Radio Access Network; Evolved Universal Terrestrial Radio Access Network (E-UTRAN); X2 application protocol (X2AP) (Release 10)," 3GPP TS 36.423 V10.4.0 (Dec. 2011), Technical Specification, 132 pages.

* cited by examiner

HIGH INTERFERENCE INDICATOR FOR TIME DIVISION DUPLEX WIRELESS COMMUNICATION SYSTEMS

CROSS REFERENCE TO RELATED APPLICATIONS

This application is related to U.S. patent application Ser. No. 14/375,235, filed on Jul. 29, 2014.

BACKGROUND

This application relates generally to communication systems, and, more particularly, to wireless communication systems.

Wireless communication systems include a network of devices for providing wireless connectivity to wireless-enabled devices including mobile units, smart phones, tablet devices, laptops, desktops, and other types of user equipment. The network access devices include base stations, base station routers, access points, e-node-Bs (eNBs), and the like. The entities within the wireless communication system generally conform to standards and/or protocols that facilitate communication over the air interface. For example, wireless communication systems are currently being developed that operate according to the Long Term Evolution (LTE) standards and/or protocols defined by the Third Generation Partnership Project (3GPP, 3GPP2). The LTE-Advanced standard supports both frequency division duplexing (FDD) and time division duplexing (TDD). Service providers are expected to implement both types of systems depending on the circumstances of the deployment scenario. The advantages to deploying a TDD system include efficient use of the radio spectrum because TDD uses a single frequency resource and does not require the paired set of frequency resources used to implement FDD.

Interference between neighboring base stations and/or user equipment can reduce the benefits of resource sharing in a TDD system. For example, base-station-to-base-station (BS-to-BS) interference occurs when one base station transmits a downlink signal to user equipment in a subframe while another base station is attempting to receive an uplink signal from other user equipment during the same subframe. For another example, user-equipment-to-user-equipment (UE-to-UE) interference occurs when one or more user equipment are transmitting uplink signals in a subframe while other user equipment are trying to receive downlink signals in the same subframe.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for supporting dynamic subframe reconfiguration in a time division duplex wireless communication system. One embodiment includes transmitting, from a first base station to a second base station, a message indicating that the first base station is configured for scheduling uplink transmissions from first user equipment in one or more subframes of a time division duplex frame. The message is transmitted when the second base station is configured for downlink transmission to second user equipment in the subframe(s).

In another embodiment, a method is provided for supporting dynamic subframe reconfiguration in a time division duplex wireless communication system. One embodiment includes receiving, from a first base station at a second base station, a first message indicating that the first base station is configured for scheduling uplink transmissions from first user equipment in one or more subframes of a time division duplex frame. The first message is transmitted when the second base station is configured for downlink transmission to second user equipment in the subframe(s).

In yet another embodiment, a method is provided for supporting dynamic subframe reconfiguration in a time division duplex wireless communication system. One embodiment includes receiving, at first user equipment from a first base station, a first message instructing the user equipment to perform at least one measurement during one or more subframes in a time division duplex frame. The first message is received in response to the first base station determining that a second base station is configured for scheduling uplink transmissions from second user equipment in the subframe(s) and the first base station is configured for downlink transmission to the first user equipment in the subframe(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
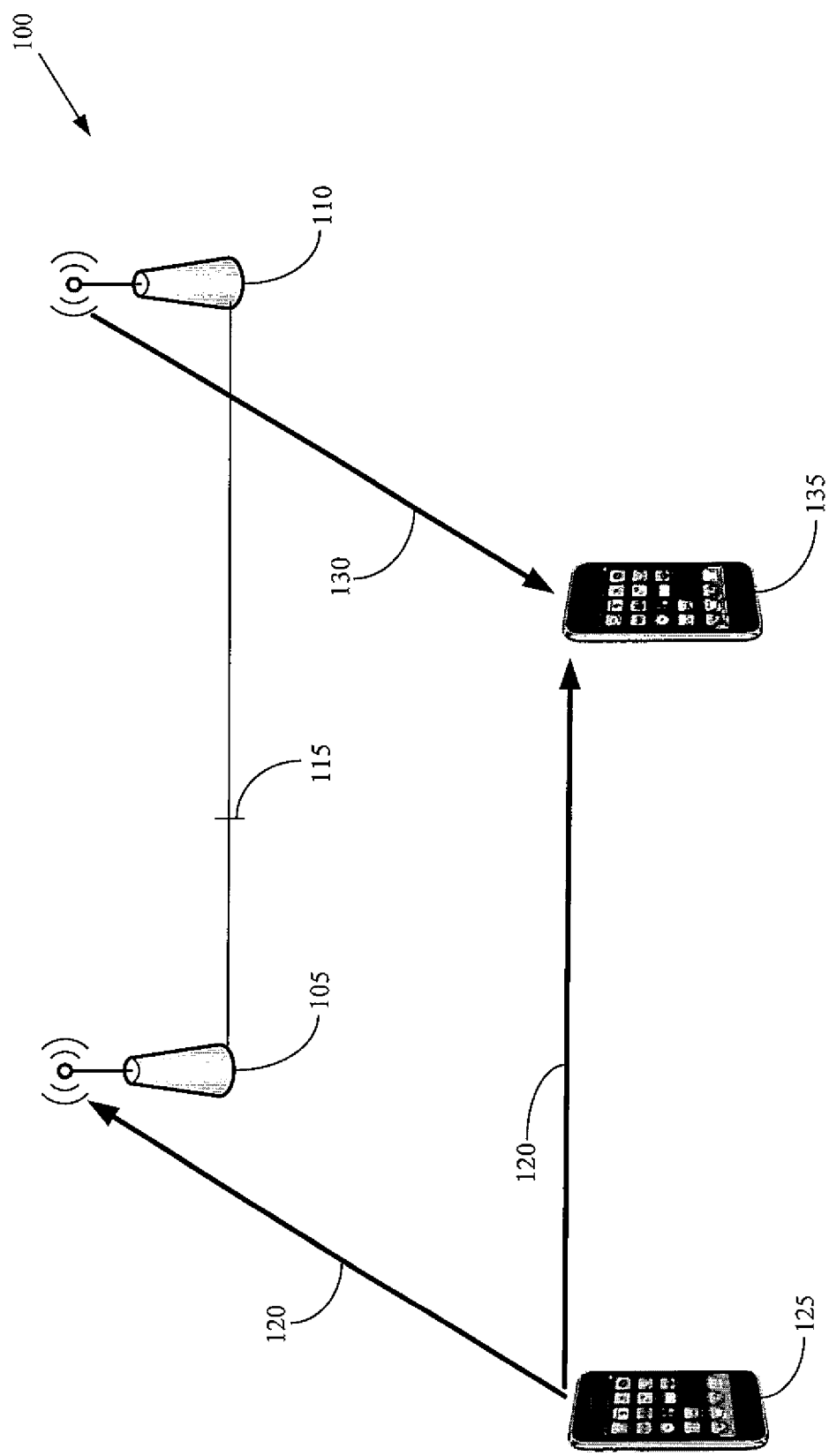
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques that can be used to support dynamic reconfiguration of the allocation of subframes to uplink and downlink transmission in a wireless communication system that operates according to time division duplexing (TDD). For example, wireless communication standards such as LTE-Advanced allow different cells, base stations (BSs), or eNBs to select different allocations of the subframes to uplink and downlink transmission. LTE-A also supports dynamic reconfiguration of the uplink/downlink subframes in a TDD system. For example, the subframe allocation of an eNB can be changed during operation, e.g., the subframe allocation can be reconfigured to select a new allocation from among different subframe configurations supported by LTE-A. However, significant UE-to-UE interference can occur between user equipment when one base station schedules uplink transmissions from first user equipment in the same subframe that is used by other nearby user equipment to receive and decode downlink transmissions from a different base station. This type of UE-to-UE interference occurs when the different base stations are using different subframe allocations so that the same subframe is used for uplink and downlink transmissions by different base stations.

Embodiments of the techniques described herein provide mechanisms that allow UE-to-UE interference to be detected and/or predicted so that the interference can be mitigated or reduced. In one embodiment the wireless communication system determines that first user equipment is receiving uplink signals transmitted from second user equipment to a second base station in the subframe that a first base station is using to transmit downlink signals to the first user equipment. The presence of the interfering signal can be determined using information provided by the interfering base station. Alternatively, the first user equipment can perform measurements in the subframe and then signal the results of these measurements back to the first base station. The first or the second base station can then take steps to mitigate or reduce the interference. In one embodiment, the interfering base station stops scheduling uplink transmissions from the second user equipment during the subframe. Alternatively, the first (interfered) base station may stop transmitting downlink signals to the first user equipment during the subframe. In cases where the mismatch between the subframe allocations is caused by a dynamic change in the subframe allocation used by either the first or second base station, the change may be reversed or an additional change may be made to resolve the mismatch.

FIG. 1 conceptually illustrates a first exemplary embodiment of a wireless communication system 100. In the illustrated embodiment, the wireless communication system 100 includes base stations 105, 110 that provide wireless connectivity using TDD standards and/or protocols. For example, the base stations 105, 110 may operate according to the LTE-Advanced standards and/or protocols established by 3GPP. However, persons of ordinary skill in the art having benefit of the present disclosure should appreciate that the base stations 105, 110 may alternatively operate according to different standards and/or protocols that support time division duplexing over the air interface. In the illustrated embodiment, the base stations 105, 110 can communicate over an interface 115 by exchanging signaling and/or messages over the interface 115. For example, the interface 115 may be an X2 backhaul interface supported by the wireless communication system 100. The Long Term Evolution (LTE) of the standards and/or protocols defined by the Third Generation Partnership Project (3GPP) specifies an X2 interface for providing signaling between e-node Bs (eNBs). The X2 interface is used to carry signaling related to mobility management, load management, error reporting, and the like. Embodiments of the X2 interface are described in the 3GPP Technical Specification 36.423. However, other embodiments may use other types of interfaces that may include devices such as routers, switches, wired and/or wireless links, and the like to support communication between the base stations 105, 110.

The base stations 105, 110 can be configured to operate using one of a plurality of uplink/downlink allocations of the TDD resource. One exemplary set of uplink/downlink allocations is depicted in Table 1, which shows the uplink/downlink allocations defined by embodiments of the LTE-A standards and/or protocols. Table 1 shows seven different available configurations that have different ratios of downlink-to-uplink resources. The different configurations also provide different switch-point periodicities (5 ms or 10 ms) and allocate different subframes to the downlink (D), uplink (U), and special (S) transmissions. However, persons of ordinary skill in the art having benefit of the present disclosure should appreciate that the allocations indicated in Table 1 are intended to be exemplary and alternative sets of predetermined allocations may also be used. In the illustrated embodiment, the base stations 105, 110 can use any of the available configurations and can dynamically switch between different configurations during operation. Moreover, the base stations 105, 110 may be able to independently reconfigure their uplink/downlink allocations. One of the advantages of TDD systems over FDD systems is that its air-interface frame structure is uplink-downlink asymmetric. Thus, within one TDD frame, the number of uplink TTIs could be different from the number of downlink TTIs and the uplink/downlink ratio can be dynamically configured, e.g., to respond to the variations of the UL-DL traffic, changing environmental or channel conditions, and the like.

TABLE 1

| Configuration | DL:UL Ratio | Switch-point Periodicity | \multicolumn{10}{c}{Subframe Number} | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 1:3 | 5 ms | D | S | U | U | U | D | S | U | U | U |
| 1 | 1:1 | 5 ms | D | S | U | U | D | D | S | U | U | D |
| 2 | 3:1 | 5 ms | D | S | U | D | D | D | S | U | D | D |
| 3 | 2:1 | 10 ms | D | S | U | U | U | D | D | D | D | D |
| 4 | 7:2 | 10 ms | D | S | U | U | D | D | D | D | D | D |
| 5 | 8:1 | 10 ms | D | S | U | D | D | D | D | D | D | D |
| 6 | 3:5 | 10 ms | D | S | U | U | U | D | S | U | U | D |

Uplink communications from one of the user equipment to a base station can interfere with the downlink reception of signals transmitted by the other base station(s) to other user equipment in the system 100. In the illustrated embodiment, base station 105 schedules and receives uplink signals 120 from one or more user equipment 125. The uplink signals 120 are transmitted concurrently with reception of downlink signals 130 that are transmitted from the base station 110 to the user equipment 135. Mismatches between the uplink and downlink subframe allocations may lead to interference between the signals 120, 130. For example, the base stations 105, 110 may be using different subframe allocations so that the user equipment 125 transmits the uplink signal 120 during an allocated uplink subframe that is the same as a downlink subframe allocated to the base station 110 by its corresponding subframe allocation. The uplink signals 120 may be scheduled by the base station 110 during the subframe and may therefore interfere with the downlink signal 130.

The presence of the interfering signal can be detected using signaling from the interfering base station 105 and/or measurements performed by the user equipment 135. In one embodiment, the interfering base station 105 transmits messages over the interface 115 to inform the base station 110 that it is using a subframe allocation to schedule uplink transmissions from user equipment 125. The messages may also indicate that the subframe allocation conflicts with the subframe allocation used by the base station 110 for downlink transmissions to user equipment 135. The base station 110 may use this information to determine that interference could be present at the user equipment 135 and the base station 110 may therefore modify downlink transmissions accordingly. Alternatively, user equipment 135 can perform measurements during the subframe to detect the presence of the interfering signal 120. The user equipment can signal the results of these measurements to the base station 110. When the base station 110 determines that interference is present during one or more subframes, the base station 110 may transmit a message to the base station 105 indicating that the base station 110 detected interference caused by uplink signals that are being scheduled by the base station 105 in the subframe that has been allocated for reception of downlink signals at user equipment 135. The base station 105 may then modify its scheduled uplink transmissions to reduce interference in the subframe, e.g., by changing a scheduling so that interfering uplink signals 120 are not transmitted during the subframe. Alternatively, the base station 110 may schedule downlink signals 130 during other subframes to avoid collisions with the uplink signals 120.

Figure 2A:
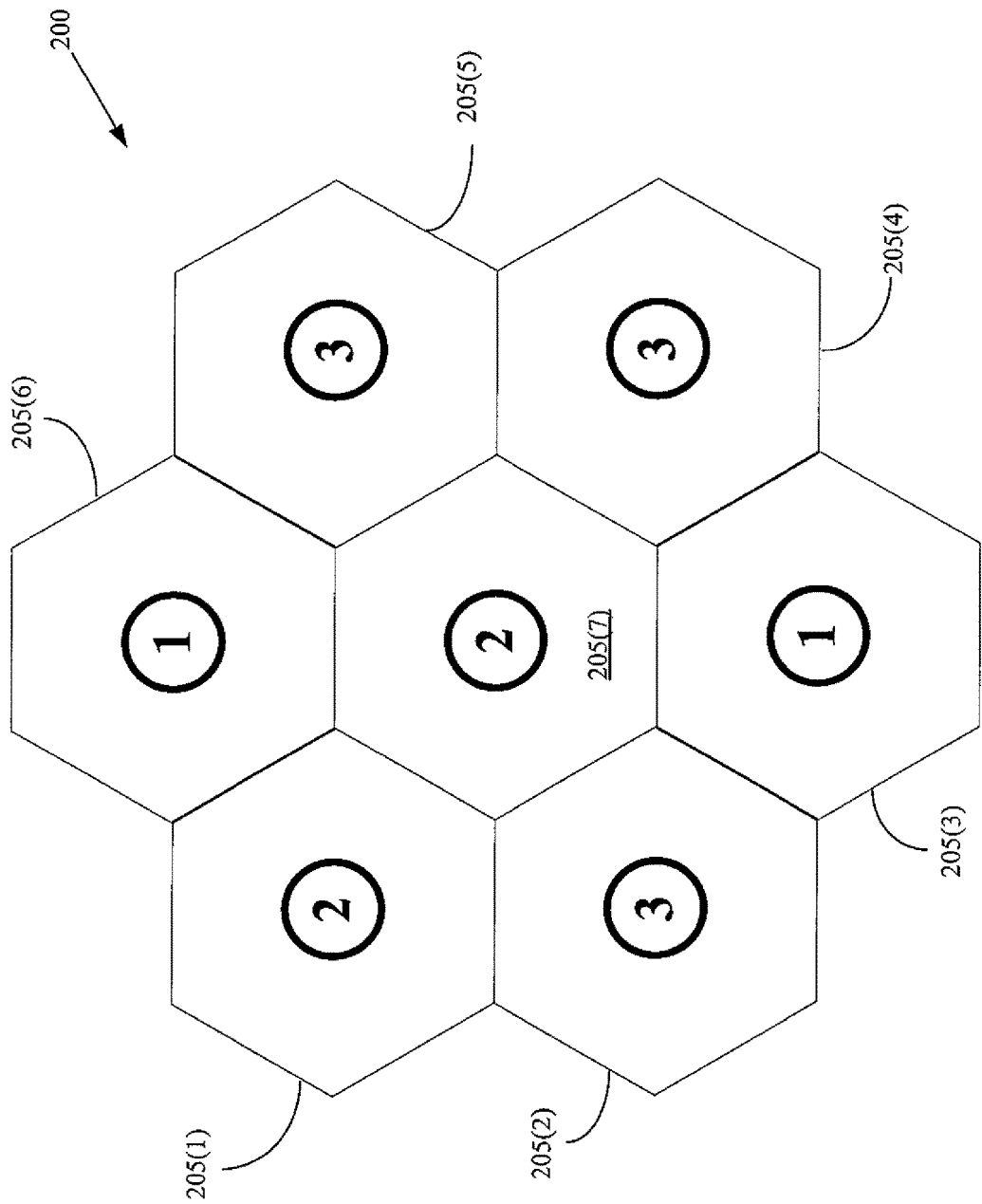
FIG. 2A conceptually illustrates a second exemplary embodiment of a wireless communication system.

FIG. 2A conceptually illustrates a second exemplary embodiment of a wireless communication system 200. In the illustrated embodiment, the wireless communication system 200 includes a plurality of cells 205. User equipment within the cells 205 may access the wireless communication system 200 over an air interface with one or more base stations or eNBs (not shown in FIG. 2A). The cells 205 may be operated by the same service provider or by one or more different service providers and they may operate according to the same or different standards and/or protocols. In the illustrated embodiment, the cells 205 support time division duplexing. For example, each of the cells 205 may be configured to use one of a plurality of subframe allocations that indicates allocation of the subframes to uplink or downlink transmissions. Different subframe allocations are indicated by the different circled boldfaced numerals within the cells 205. In different embodiments, the allocations may be static or dynamically changing, e.g., to reflect changes in channel conditions, environmental conditions, requested quality of service on the uplink and/or downlink, or other variations in the context.

Mismatches in the subframe allocations that are selected by the different cells 205 and/or are assigned to each cell 205 can lead to inter-UE interference, which may also be referred to as UE-to-UE interference. For example, uplink and downlink transmissions associated with adjacent or nearby cells 205(2, 7) may conflict and interfere when the cell 205(2) allocates a subframe for uplink transmission by user equipment and the cell 205(7) allocates the same subframe for downlink transmission to user equipment. In that case, the uplink transmissions from user equipment in the cell 205(2) may interfere with the downlink transmissions received at other user equipment from the cell 205(7), which may make it more difficult for the user equipment to detect and/or decode the received downlink signal. The number of subframes that are mismatched and can potentially interfere depends on the topology of the communication system 200 and the subframe allocations used by the cells 205.

Figure 2B:
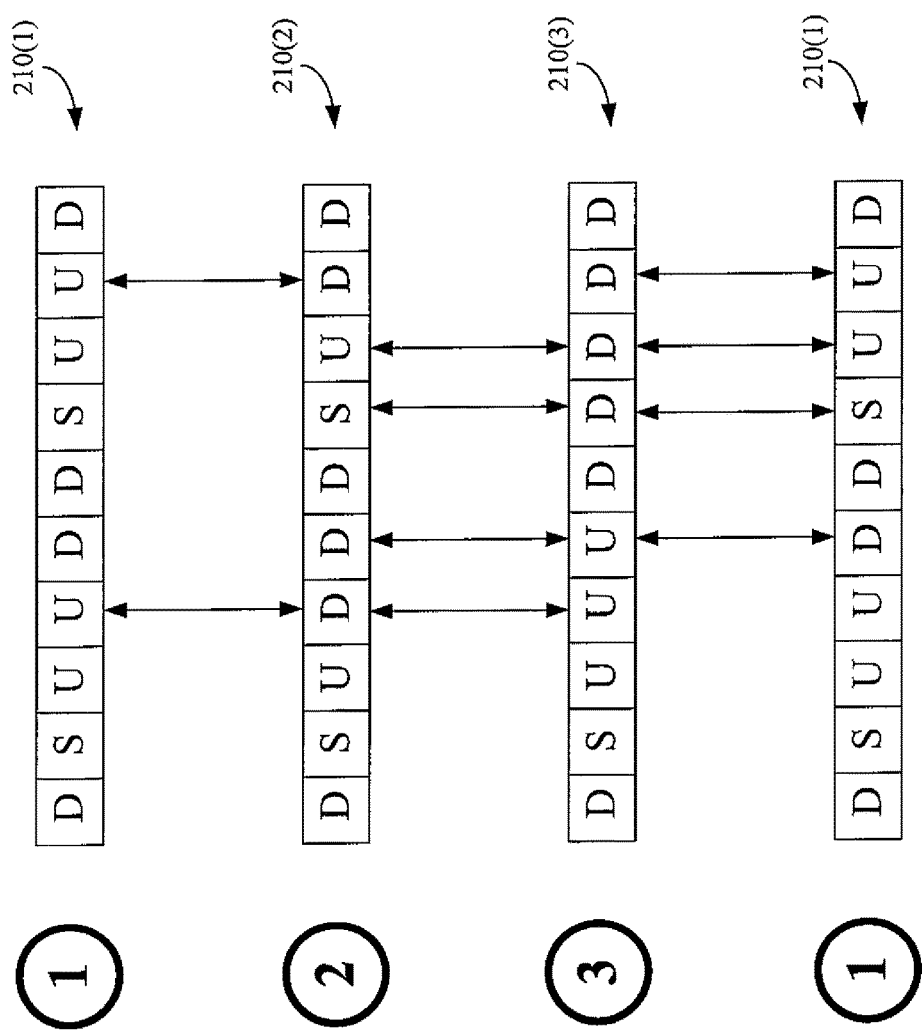
FIG. 2B conceptually illustrates the subframe allocations corresponding to the allocations associated with the cells illustrated in FIG. 2A.

FIG. 2B conceptually illustrates the subframe allocations 210 corresponding to the allocations associated with the cells 205 illustrated in FIG. 2A. In the illustrated embodiment, the subframe allocations show the allocation of 1 ms subframes that have a periodicity of 5 ms (for the subframes 210(1,2)) or 10 ms (for the subframe 210(3)). The subframes can be allocated to downlink (D), uplink (U), or special (S) subframes. The subframe allocation 210(1) is repeated to facilitate a comparison with the allocation of the subframe allocation 210(3). In the illustrated embodiment, the subframe allocations 210(1, 2) are mismatched in two subframes, as indicated by the double headed arrows. The fourth and ninth subframes are allocated to uplink (U) transmissions for the subframe allocation 210(1) but they are allocated for downlink (D) transmissions in the subframe allocation 210(2). These mismatched allocations are potential candidates for BS-to-BS interference. The subframe allocations 210(2, 3) are mismatched in four subframes indicated by the double headed arrows and the subframe allocations 210(1, 3) are mismatched in four subframes indicated by the double headed arrows. These mismatched subframes are also potential candidates for BS-to-BS interference.

Figure 3:
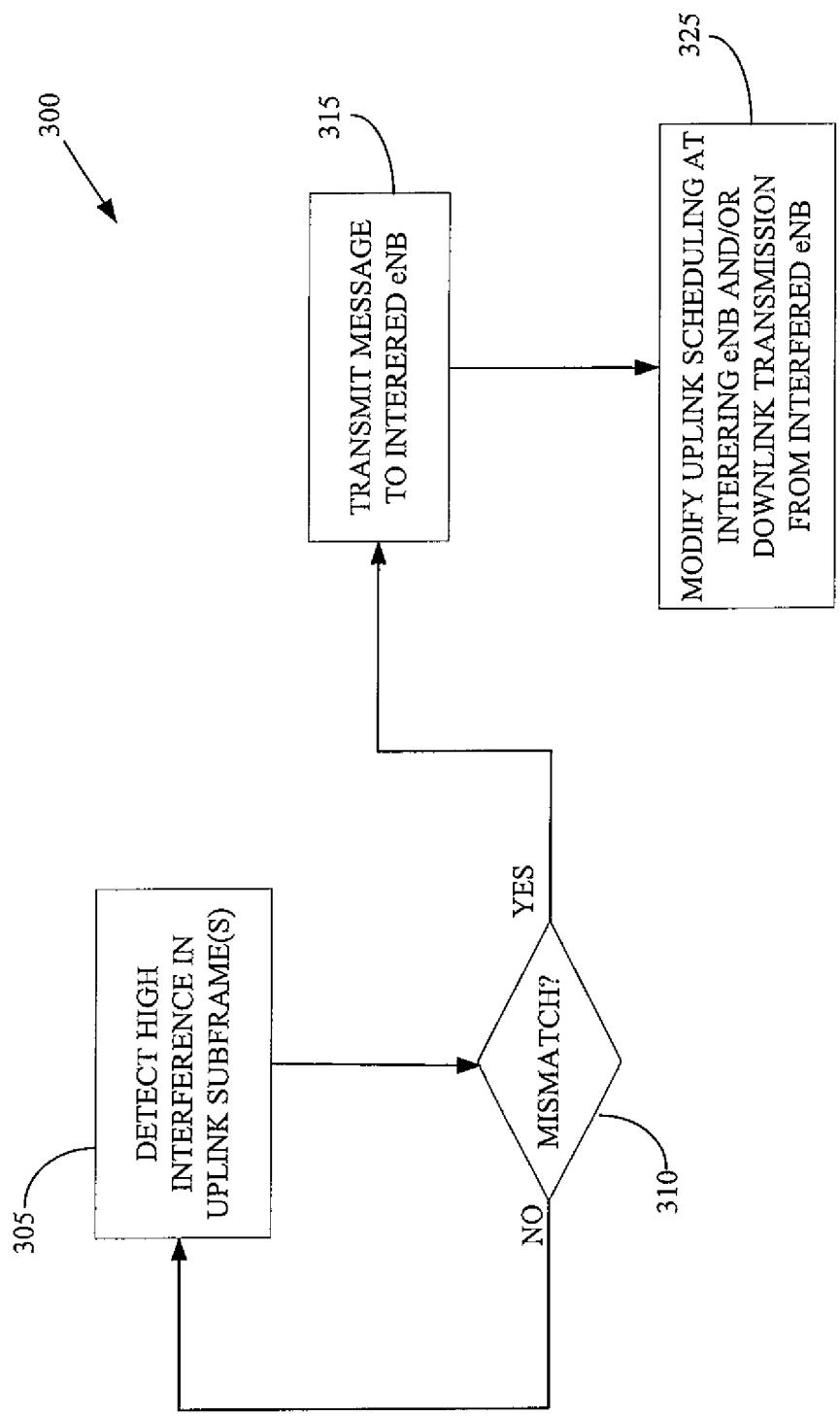
FIG. 3 conceptually illustrates a first exemplary embodiment of a method of coordinating transmissions from base stations in a time division duplex wireless communication system.

FIG. 3 conceptually illustrates a first exemplary embodiment of a method 300 of coordinating transmissions from base stations in a time division duplex wireless communication system. In the illustrated embodiment, a base station or eNB detects (at 305) that interference may be present in one or more subframes allocated for uplink transmissions scheduled to be transmitted from user equipment to the base station, which may be referred to as an interfering base station because it schedules the uplink transmissions that may lead to UE-to-UE interference. The subframe allocation may be selected from a set of subframe allocations supported by the deployment, as discussed herein. The base station may then determine (at 310) whether the interference may be caused by a mismatch between the subframe allocation of the interfering base station and a subframe allocation of another (interfered) base station or eNB. The interfering base station may continue to monitor interference conditions (e.g., the number of user equipment that the interfering base station has scheduled for uplink transmission) as long as the interference is not caused by a mismatch in the subframe allocations. However, if the subframe allocation of the interfering base station is mismatched with the subframe allocation of the other base station, the interfering base station may transmit (at 315) a message indicating the presence of interference and the subframe allocation mismatch to the other base station. For example, the base stations may exchange this information over an X2 interface.

One exemplary message that may be transmitted to indicate the presence of interference and the subframe allocation mismatch may be a modified uplink high interference indicator. For example, Section 9.2.17 of TS 36.423, defines a conventional information element (IE) that contains a conventional high interference indicator. This IE provides, per physical resource block (PRB), a 2 level report on interference sensitivity. The interaction between the indication of UL Overload and UL High Interference indicator is implementation specific. The conventional definition of the high interference indicator is given by:

| IE/ Group Name | Presence | Range | IE type and reference | Semantics description |
|---|---|---|---|---|
| HII | M | | BIT STRING (1 ... 110, ...) | Each position in the bitmap represents a PRB (first bit = PRB 0 and so on), for which value "1" indicates 'high interference sensitivity' and value "0" indicates 'low interference sensitivity'. The maximum number of Physical Resource Blocks is 110 |

Embodiments of the techniques described in the present application may use a different information element that can be seen as a modified version of the conventional high interference indicator. In one embodiment, the modified information element (IE) provides, per PRB, a 2 level report on interference sensitivity and a Boolean value that is set to TRUE to indicate a mismatch between the subframe allocations of the base station that transmits the high interference indicator and the recipient base station. The interaction between the indication of UL Overload and UL High Interference is implementation specific. The definition of one embodiment of the modified high interference indicator is given by:

| IE/ Group Name | Presence | Range | IE type and reference | Semantics description |
|---|---|---|---|---|
| HII | M | | BIT STRING (1 ... 110, ...) | Each position in the bitmap represents a PRB (first bit = PRB 0 and so on), for which value "1" indicates 'high interference sensitivity' and value "0" indicates 'low interference sensitivity'. The maximum number of Physical Resource Blocks is 110 |
| TDD UL-DL Mismatch Flag | O | | BOOLEAN: TRUE or FALSU | True is set when the recipient eNB TDD subframe assignment is different from the sender eNB TDD Subframe Assignment |

The high interference indicator may use a single bit Flag to indicate the mismatch between the subframe assignments. The base station recipient of the adapted high interference indicator can use implementation specific steps to mitigate the UE-to-UE interference indicated in the message. For example, the recipient base station may stop scheduling downlink transmissions to affected UEs when the interference indicator indicates that a large number of uplink transmissions have been scheduled by the interfering base station. In one embodiment, the message informs the recipient eNB of the TDD subframe assignment at the interfering base station. In the illustrated embodiment, the format of the Rel-10 HII may be left unchanged but an optional Flag bit (TDD UL-DL Mismatch Flag) can be added. In this case, the interfering base station may inform the interfered eNB of the presence of high interference (e.g., due to scheduling large numbers of uplink transmissions from user equipment) and the mismatch of the TDD subframe allocation. This mismatch could be due to changes in the subframe allocations at either of the base stations. Since the current TDD subframe allocation IE can be signaled in this technique, embodiments of the modified high interference indicator may provide an "indirect" IE to signal the mismatch. In one embodiment, the TDD UL-DL Mismatch Flag may be an optional flag in the information element.

Figure 4:
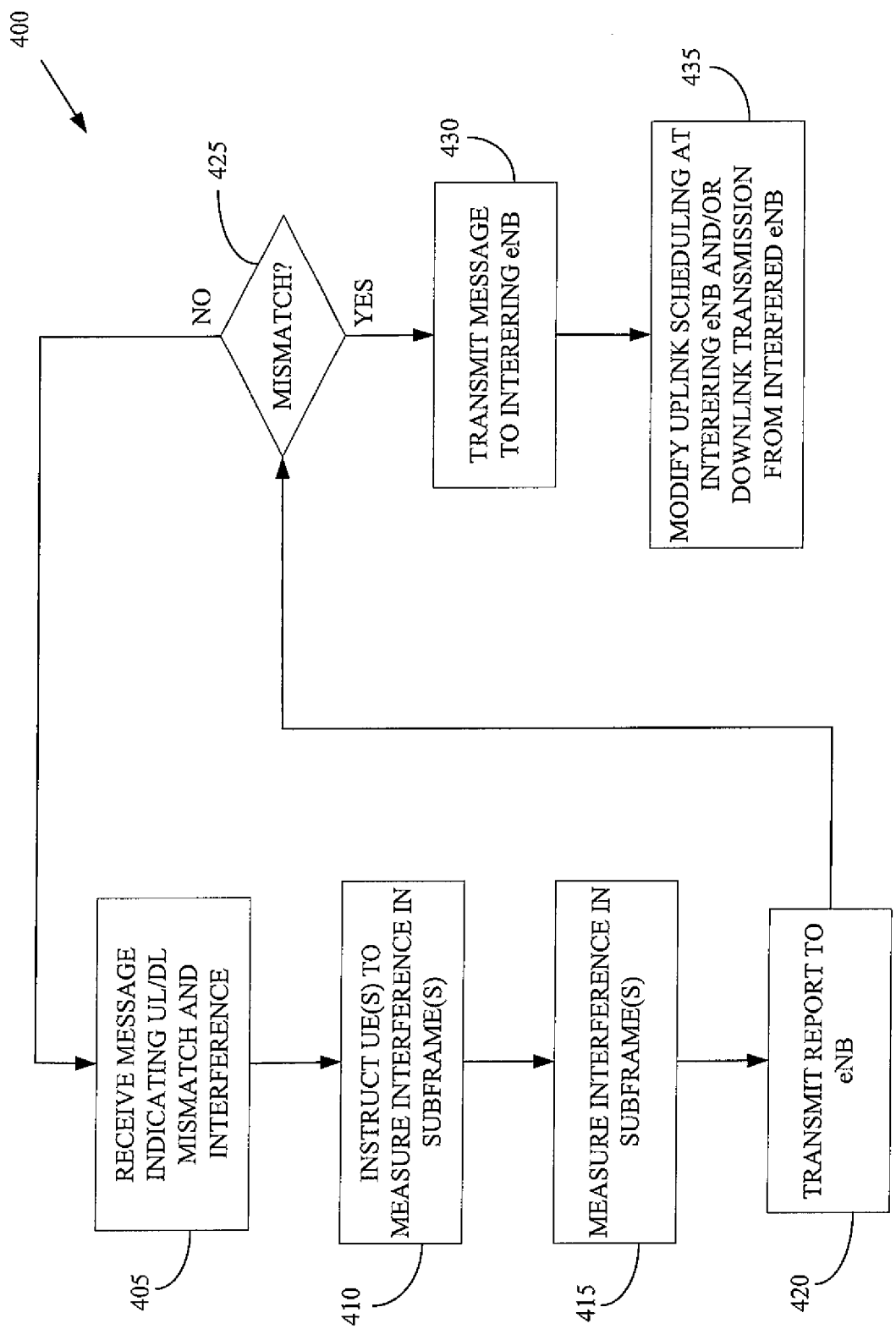
FIG. 4 conceptually illustrates a second exemplary embodiment of a method of coordinating transmissions from base stations in a time division duplex wireless communication system.

FIG. 4 conceptually illustrates a second exemplary embodiment of a method 400 of coordinating transmissions from base stations in a time division duplex wireless communication system. In the illustrated embodiment, user equipment that are experiencing interference can be identified, e.g., by the interfered base station. For example, interference at different user equipment can be identified using radio link failure statistics, restricted measurements performed by user equipment and configured at an associated base station, channel quality measurements of downlink transmissions, and the like. When the interfered base station determines that scheduled uplink transmissions to the interfering base station is interfering with reception of downlink signals at user equipment associated with the interfered base station, the interfered base station can transmit a message that is received (at 405) by the other (interfering) base station. For example, the base station may receive (at 405) this information over an X2 interface.

The interfered base station can instruct (at 410) associated user equipment to perform measurements of interference in one or more subframes of the time division duplex frame. In one embodiment, when faced with high interference, user equipment can be signaled and instructed to perform (at 415) a restricted pattern measurement. This approach may be used when the interfering base station has configured almost blank subframes (ABS) on the downlink so that the restricted measurements can be performed concurrently with the downlink ABS. Alternatively, user equipment can be instructed (at 410) to perform (at 415) restricted measurements for the purpose of measuring the interference in a TDD deployment where adjacent cells are configuring or changing their subframe allocations in a dynamic manner. For example, user equipment can be instructed (at 410) to perform (at 415) radio link monitoring measurements, radio resource management measurements, channel state information measurements, and the like. The base station may re-use existing Rel-10 functionalities to signal user equipment to perform (at 415) restricted measurement on a specific uplink subframe and the base station may support the measurements by bypassing scheduling of uplink transmissions for the user equipment so that the user equipment can perform (at 415) the downlink measurements of interference from other user equipment or any other sources.

User equipment can report (at 420) results of the measurements to the corresponding base station. For example, user equipment can report a reference signal received quality (RSRQ), a reference signal received power (RSRP), or other measurement results that may be determined by performing measurements on a common reference signal transmitted by one or more base stations such as the interfering base station. If the reports indicate that user equipment is experiencing high downlink interference, e.g., when the received quality or power of the common reference signal is above a threshold value, the interfered base station may determine (at 425) if there is a mismatch between the subframe allocations of the interfered and interfering base stations. As long as there is no mismatch, the interfered base station can continue to wait to receive (at 405) other messages indicating a possible mismatch and downlink interference.

When the base station determines (at 425) that a mismatch between subframe allocations exists, the base station can transmit (at 430) a message to inform the interfering base station of the mismatch and the interference. In one embodiment, the base station transmits (at 430) a high interference indicator. For example, the base station may transmit (at 430) an information element including a modified TDD Subframe DL High Interference Indicator (Subframe DL-HII):

| IE/Group Name | Presence | Range | IE type and reference | Semantics description |
|---|---|---|---|---|
| Subframe DL-HII | M | | BIT STRING (1 . . . 70) | Each position in the bitmap represents a subframe for which value "'1" indicates subframe with 'high interference. |

This embodiment of the high interference indicator includes a bit string and each position in the bit string is associated with a different subframe. Values of each bit can indicate the presence of high interference in the corresponding subframe.

In some alternative embodiments, the information element may be used to facilitate frequent TDD Subframe Allocation IE changes on timescales of the order of multiples of 10 ms, which is significantly different than the current capability of the TDD Subframe Allocation IE. Other alternative embodiments may include transmitting timing information such as a bitmap with specified periodicity with granularity of multiple of 10 ms that is associated with the Subframe Assignment IE and/or a timer to indicate the validity of the TDD Subframe Assignnment IE and/or other methods that can be used to indicate or represent a "time to live" for the information element.

One or more of the base stations may modify (at 435) their transmission parameters in response to transmission of the message indicating interference and the mismatch between the subframe allocations. In one embodiment, the recipient of the IE (e.g., the interfering base station) may use implementation specific steps to mitigate the UE-to-UE interference indicated in the message. For example, the interfering base station may stop scheduling uplink transmissions in the conflicting or mismatched subframe. For another example, the interfered base station may stop scheduling transmissions to affected user equipment over the conflicting or mismatched downlink subframe once the base station realizes that the interference is due to a subframe allocation mismatch such as a mismatch created due to a DL-UL subframe reconfiguration at either the interfering or the interfered base station. Alternatively, the interfered base station could inform the interfering base station of its current status by reporting a relative narrowband transmit power (RNTP) bitmap that the interfered base station expects to receive from the interfering base station.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device, comprising:
a memory with executable instructions stored thereon; and
a processor configured to access said memory to execute said instructions and further configured for:
transmitting, from a first base station to a second base station, a message indicating that the first base station is configured to schedule uplink transmissions from first user equipment in at least one subframe of a time division duplex frame, wherein the message is transmitted if the second base station is configured for downlink transmission to a second user equipment in said at least one subframe by transmitting a modified information element that includes:
a report on interference sensitivity; and
a Boolean value set to true to indicate a mismatch.

2. The device of claim 1, wherein the processor is further configured for determining that there is a mismatch between a first subframe allocation used by the first base station and a second subframe allocation used by the second base station so that said at least one subframe is allocated for uplink transmissions to the first base station and downlink transmissions from the second base station.

3. The device of claim 2, wherein the processor is further configured for transmitting the message in response to determining that the mismatch exists between the first and second subframe allocations.

4. The device of claim 2, wherein the processor is further configured for determining that there is a mismatch by determining that there is a mismatch in response to a first modification of at least one of the first subframe allocation or the second subframe allocation.

5. The device of claim 4, wherein the processor is further configured for performing a second modification of said at least one of the first subframe allocation or the second subframe allocation in response to determining that the first modification generated the mismatch.

6. The device of claim 2, wherein the processor is further configured for bypassing scheduling uplink transmissions from the first user equipment in response to determining that there is a mismatch between the first and second subframe allocations.

7. The device of claim 2, wherein the processor is further configured for receiving a second message from the second base station at the first base station, wherein the second message indicates that the second user equipment is receiving interference in said at least one subframe.

8. The device of claim 7, wherein the processor is further configured for bypassing scheduling of uplink transmissions from the first user equipment in said at least one subframe when the information received from the second user equipment indicates that the second user equipment is receiving interference in said at least one subframe.

9. A device, comprising:
a memory with executable instructions stored thereon; and
a processor configured to access said memory to execute said instructions and further configured for:
receiving, from a first base station at a second base station, a first message indicating that the first base station is configured to schedule uplink transmissions from first user equipment in at least one subframe of a time division duplex frame, wherein the first message is transmitted if the second base station is configured for downlink transmission to a second user equipment in said at least one subframe, and wherein the first message comprises a modified information element that includes:
a report on interference sensitivity; and
a Boolean value set to true to indicate a mismatch.

10. The device of claim 9, wherein the processor is further configured for bypassing scheduling downlink transmissions to the second user equipment in said at least one subframe in response to receiving the message.

11. The device of claim 9, wherein the processor is further configured for instructing, in response to receiving the first message, the second user equipment to perform at least one of a radio link monitoring measurement, a radio resource management measurement, or a channel state information measurement in said at least one subframe.

12. The device of claim 11, wherein the processor is further configured for receiving information from the second user equipment that is indicative of said at least one radio link monitoring measurement, radio resource management measurement, or channel state information measurement performed during said at least one subframe.

13. The device of claim 12, wherein the processor is further configured for transmitting a second message from the second base station to the first base station, wherein the second message indicates that the second user equipment is receiving interference in said at least one subframe.

14. The device of claim 13, wherein the processor is further configured for bypassing downlink transmissions to the second user equipment in said at least one subframe when the information received from the second user equipment indicates that the second user equipment is receiving interference in said at least one subframe.

15. A first base station, comprising:
a transmitter configured to transmit, to a second base station, a message indicating that the first base station is configured to schedule uplink transmissions from first user equipment in at least one subframe of a time division duplex frame; and
wherein the transmitter is further configured to transmit the message if the second base station is configured for downlink transmission to a second user equipment in said at least one subframe;
wherein the transmitter is further configured to transmit the message by transmitting a modified information element that includes:
a report on interference sensitivity; and
a Boolean value set to true to indicate a mismatch.

16. A first base station, comprising:
a transmitter configured to transmit, to a second base station, a message indicating that the first base station is configured to schedule uplink transmissions from first user equipment in at least one subframe of a time division duplex frame; and
wherein the transmitter is further configured to transmit the message if the second base station is configured for downlink transmission to a second user equipment in said at least one subframe; and
wherein the message comprises a high interference indicator that uses a single bit Flag to indicate a mismatch.

17. A device, comprising:
a memory with executable instructions stored thereon; and
a processor configured to access said memory to execute said instructions and further configured for:
transmitting, from a first base station to a second base station, a message indicating that the first base station is configured to schedule uplink transmissions from first user equipment in at least one subframe of a time division duplex frame, wherein the message is transmitted if the second base station is configured for downlink transmission to a second user equipment in said at least one subframe;
wherein the message comprises a high interference indicator that uses a single bit Flag to indicate a mismatch.

18. A device, comprising:
a memory with executable instructions stored thereon; and
a processor configured to access said memory to execute said instructions and further configured for:
receiving, from a first base station at a second base station, a first message indicating that the first base station is configured to schedule uplink transmissions from first user equipment in at least one subframe of a time division duplex frame, wherein the first message is transmitted if the second base station is configured for downlink transmission to a second user equipment in said at least one subframe;
wherein the message comprises a high interference indicator that uses a single bit Flag to indicate a mismatch.

* * * * *